United States Patent

Marsanne

[19]

[11] Patent Number: 5,917,292
[45] Date of Patent: *Jun. 29, 1999

[54] CONTROLLER FOR APPLICATIONS PERTAINING TO THE DISPLAY OF IMAGES ON CATHODE-RAY TUBE SCREENS

[75] Inventor: Sébastien Marsanne, Diderot, France

[73] Assignee: SGS-Thomson Microelectronics S.A., Saint Genis, France

[*] Notice: This patent issued on a continued prosecution application filed under 37 CFR 1.53(d), and is subject to the twenty year patent term provisions of 35 U.S.C. 154(a)(2).

[21] Appl. No.: 08/657,459

[22] Filed: May 29, 1996

[30] Foreign Application Priority Data

May 31, 1995 [FR] France .................................. 95 06495

[51] Int. Cl.$^6$ .............................. G09G 1/04; H04N 3/24
[52] U.S. Cl. .......................................... 315/384; 348/637
[58] Field of Search .................................. 315/384, 386, 315/383; 348/634, 635, 637, 327

[56] References Cited

U.S. PATENT DOCUMENTS 4,228,464 10/1980 Duijkers .................................. 348/637
4,652,920 3/1987 Dietz ........................................ 348/637

OTHER PUBLICATIONS

French Search Report from French Patent Application 95 06495, filed May 31, 1995.
Database WPI, Week 8925 Derwent Publications Ltd., London, GB; AN 89–184692 & SU-A-1 427 597 (Minsk Gorizont Asso) Sep. 30, 1988.

Patent Abstracts of Japan, vol. 017, No. 444 (E–1415), Aug. 16, 1993 & JP–A–05 095493 (Matsushita Electric Ind. Co. Ltd.).

Patent Abstracts of Japan, vol. 012, No. 094 (E–593), Mar. 26, 1988 & JP–A–62 225077 (Kaga Denshi KK).

Patent Abstracts of Japan, vol. 006, No. 140 (E–121), Jul. 29, 1982 & JP–A–57 065067 (Hitachi Ltd.).

*Primary Examiner*—Gregory C. Issing
*Attorney, Agent, or Firm*—Wolf, Greenfield & Sacks, P.C.

[57] ABSTRACT

Disclosed is an image display screen controller for the control of a cathode-ray tube. There is produced a blanking logic signal that begins on a leading edge of the frame synchronization square-wave pulse and ends only on the trailing edge of the VFBACK signal generated from the frame flyback pulse without getting interrupted if the frame synchronization pulse and the pulse VFBACK corresponding to the frame flyback do not overlap. An RS flip-flop circuit is activated on the leading edge of the frame synchronization square-wave pulse VSYNC and is reset only by the trailing edge of the frame flyback pulse VFBACK. The output of the RS flip-flop is applied to an input of an OR gate that receives other inputs, notably the synchronization square-wave pulses and the line and frame flyback pulses. If the scanning disappears for example by the destruction of a transistor, the absence of a frame flyback pulse will prevent the reactivation of the beam and hence prevent a dot of the screen from being burned out.

27 Claims, 2 Drawing Sheets

CONTROLLER FOR APPLICATIONS PERTAINING TO THE DISPLAY OF IMAGES ON CATHODE-RAY TUBE SCREENS

BACKGROUND OF THE INVENTION

1. Field of the Invention

The invention relates generally to television receivers, which are also called display monitors, and more particularly to integrated circuits designed for the control of image displays on a cathode-ray tube.

2. Discussion of the Related Art

Image display screens based on tubes use a mode of scanning the screen by means of an electron beam. The beam scans the screen line by line and successively strikes all the luminophors deposited on the surface of the screen. The electron beam is modulated in intensity during this scan to form light dots of variable intensity on the screen. The combination of these dots form the desired image.

A control circuit, hereinafter called a screen controller, is an integrated circuit used to control the electronic circuits that set up the scanning by the beam, as well as to control the electronic circuits that modulate the intensity of the beam during this scanning operation.

Deflection of the beam along a horizontal line is produced by a horizontal deflection coil that is crossed by a periodic variable current, which produces a periodic variable magnetic field. The magnetic field deflects the beam along an image line. At the end of the line, the current in the coil is abruptly canceled so that the beam swiftly returns to the beginning of a line. This sudden cancellation produces a so-called "line flyback" pulse used as a negative feedback signal to synchronize the scanning of the screen with the video image signal.

During this time, a vertical deflection coil receives a periodically variable current, with a far longer duration than that of the variable current for the horizontal deflection coil, so that the beam shifts gradually in the vertical direction and starts on another line after the end of a previous line. At the end of a frame, the current in the vertical deflection coil is suddenly canceled and the spot swiftly returns to the start of the first line. A frame flyback pulse is produced at this time under the effect of the abrupt cancellation of current.

In practice, the composite video image signal 1 used by the screen controller can be subdivided into several parts for each image line as shown in FIG. 1a. A first part includes a line synchronization square-wave pulse, HSYNC, which is typically negative. A second part is a signal at zero enabling the black level to be adjusted. A third part is the useful signal for the modulation of the intensity of the beam which is the positive signal. The horizontal deflection current 2 is applied, as shown in FIG. 1b, for the duration of the useful signal. It is a linearly rising current that returns to zero at the end of the useful part of the signal. It is held at zero for a period of time approximately equal to about 12 microseconds, starting slightly before the beginning and ending slightly after the end of the line synchronization square-wave pulse. This interruption of the horizontal deflection current is therefore synchronized by the line synchronization square-wave pulse of the composite video signal.

The line 3 of FIG. 1c represents the line flyback pulse put out by the horizontal scanning circuit during the cancellation of the horizontal deflection current.

Periodically, the composite video signal also comprises a frame synchronization square-wave pulse 4, as illustrated in FIG. 1d. The frame synchronization square-wave pulse 4 is distinguished by its longer duration from the line synchronization square-wave pulse. Only the frame synchronization square-wave pulse is shown in FIG. 1d. A vertical deflection current 5, illustrated in FIG. 1e, is produced between two successive frame synchronization square-wave pulses. This vertical deflection current 5 is periodically interrupted to enable the return of the spot to the start of the frame and this interruption is triggered by the frame synchronization square-wave pulse 4.

The line 6 of FIG. 1f represents the frame flyback pulse produced by the vertical scanning circuit at the end of a frame.

During the time interval corresponding to the return of a spot to the start of a line and during the time interval corresponding to the return of a spot to the start of a frame, the electron beam is extinguished or "blanked" so as not to cause the appearance of luminous flyback trails on the screen. This blanking of the beam is produced by the application of a sufficiently negative voltage to a grid placed before the cathode of the electron gun of the tube or by the application of a sufficiently positive voltage to the cathode.

In the prior art, the blanking voltage is applied in two instances.

The blanking voltage is applied first at each end of a line for a duration of some microseconds needed for the return of the spot to the beginning of the line and for the reactivation of the horizontal deflection current. The blanking is produced then during a temporal square-wave pulse defined by a command signal HFBACK that is generated from the line flyback pulse and synchronized with the synchronization square-wave pulse present in the composite video signal.

The blanking voltage is also applied at each end of a frame, during a frame blanking square-wave pulse (1 to 2 milliseconds) corresponding to the frame flyback pulse, as well as during a frame synchronization square-wave pulse present in the composite video signal (about 0.5 milliseconds). The blanking is then produced firstly during a temporal square-wave pulse corresponding to the frame synchronization signal VSYNC and secondly during a temporal square-wave pulse defined by a control signal VFBACK which is generated from the frame flyback pulse.

Consequently, a blanking command logic signal called a blanking signal BLK is generated from a logic OR function receiving the signal HFBACK, the signal VFBACK and the signal VSYNC.

SUMMARY OF THE INVENTION

An aspect of the invention is directed to a circuit to control a cathode-ray tube screen for the display of images designed notably to control the synchronizing of the scanning of the screen with the video signal representing the image to be displayed. The circuit activates the blanking of an electron display beam during the line flyback and frame flyback in the scanning operation. One embodiment of the circuit comprises, to produce a blanking command logic signal, an input receiving a frame synchronization signal extracted from the image signal, an input receiving a frame flyback signal sent out when a vertical deflection current of the screen is cut off, a logic gate receiving at least the frame synchronization signal and the frame flyback signal and producing the blanking command signal. The circuit may furthermore comprise a flip-flop circuit activated by the start of the phase synchronization signal and reset by the end of the frame flyback signal, the output of the flip-flop circuit being connected to an input of the logic gate so that the blanking signal is active not only during the frame synchronization signal and during the frame flyback signal but also between these two signals when they are separated.

One embodiment of the invention includes a simple RS flip-flop circuit, said RS flip-flop circuit being activated on the leading edge of the frame synchronization square-wave pulse VSYNC for a situation in which the square-wave pulse is positive and being reset only by the trailing edge of the frame flyback pulse VFBACK (also assumed to be positive). The output of the RS flip-flop is applied to an input of an OR gate which receives other inputs, notably the synchronization square-wave line flyback and frame flyback pulses HFBACK and VFBACK.

BRIEF DESCRIPTION OF THE DRAWINGS

Other features and advantages of the invention shall appear from the following detailed description, made with reference to the appended drawings of which.

DETAILED DESCRIPTION

An embodiment of the present invention is directed to an improvement in the control circuit of the tube, wherein there is produced a logic blanking signal that starts with an initial leading edge of the frame synchronization square-wave pulse and ends only on the trailing edge of the signal VFBACK generated from the frame flyback pulse (it being assumed that the end of this signal is marked by a trailing edge) without getting interrupted if the frame synchronization square-wave pulse and the pulse VFBACK corresponding to the frame flyback do not overlap. In this embodiment, the logic blanking signal no longer results from a simple logic OR function between the two square-wave pulses.

Thus, if for one reason or another the scanning disappears (for example by the destruction of a transistor), the absence of a frame flyback pulse, hence the absence of a trailing edge of this pulse, will prevent the beam from being reactivated and therefore prevent a dot of the screen from being burned out. Similarly, when the input signals HSYNC and VSYNC are not acceptable to the circuits of a monitor, or when their frequencies are not stable, a controller may force the blanking signal directly if it is provided with the function of the invention.

Figure 1A:
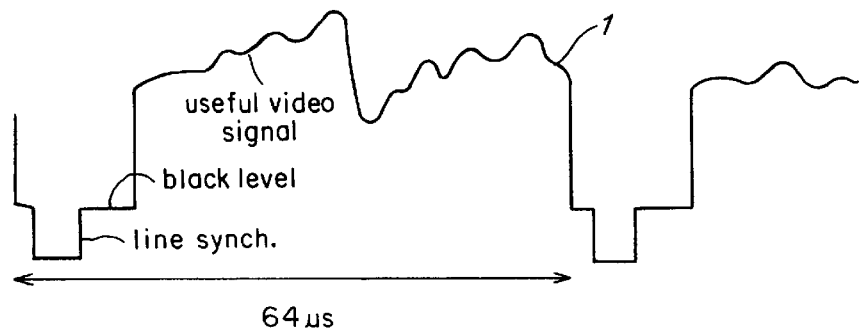
FIG. 1a shows a composite video image signal.
Figure 1B:
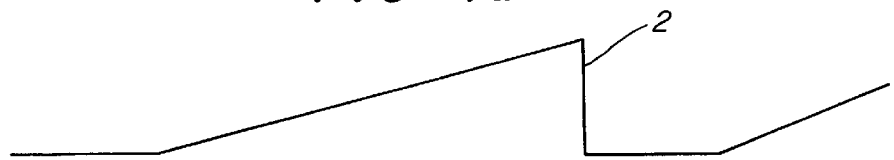
FIG. 1b illustrates a waveform of a horizontal deflection current.
Figure 1C:
FIG. 1c illustrates a waveform of a line flyback pulse.
Figure 1D:
FIG. 1d shows a frame synchronization square-wave pulse.
Figure 1E:
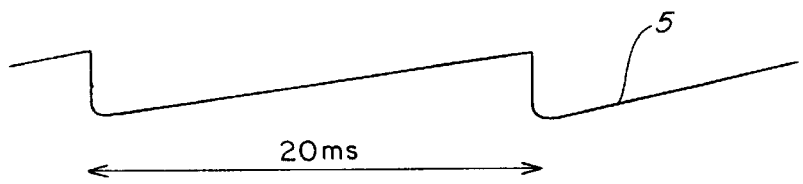
FIG. 1e shows a waveform of a vertical deflection current.
Figure 1F:
FIG. 1f illustrates a frame flyback pulse.
Figure 2:
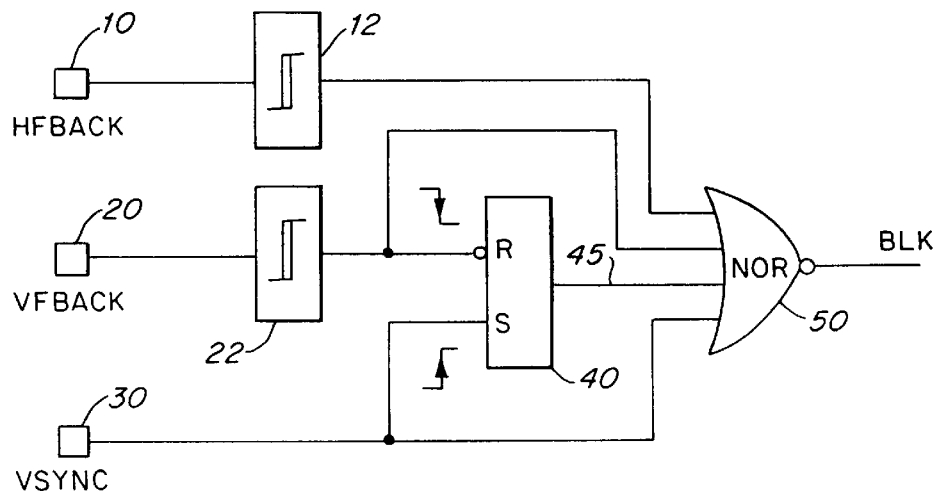
FIG. 2 shows the circuit according to an embodiment of the invention.

The improved screen controller according to an embodiment of the invention comprises, preferably in its integrated circuit, the small circuit shown in FIG. 2. This small circuit has three signal inputs respectively receiving the signal HFBACK, the signal VFBACK and the signal VSYNC defined here above, all three of which are assumed to be signals with positive polarity.

The signal HFBACK is applied to a first input 10 connected to a first threshold comparator 12 for the logic shaping of this signal if need be.

Similarly, the signal VFBACK is connected to a second input 20 connected to a second threshold comparator 22 for the shaping of this signal if need be.

The signal VSYNC is connected to a third input 30.

A four-input NOR gate 50 respectively receives:

the shaped signal HFBACK;

the shaped signal VFBACK;

the signal VSYNC which in principle is already shaped; and the output 45 of an RS flip-flop circuit 40.

The RS flip-flop circuit 40 provides a square-wave pulse, which may be referred to as an intermediate signal, starting at the beginning (rising edge) of the signal VSYNC (with positive polarity) and ending only at the end (trailing edge) of the signal VFBACK (positive polarity). This RS flip-flop circuit 40 receives the signal VSYNC at its input S (flip-over input) and the logic complement of the shaped signal VFBACK at its input R (input for resetting in the initial state).

The NOR gate 50 may give the blanking signal BLK at its output in accordance with the diagram of FIG. 3. The blanking signal is active (for the blanking of the beam) at the low level in this example, so that the blanking takes place when BLK is at the low logic level.

The beam is therefore extinguished by the signal BLK:

at each line flyback, defined by the signal HFBACK;

at each reception of a frame synchronization signal VSYNC;

during each frame flyback, defined by the signal VFBACK; and between the end of the square-wave pulse VSYNC and the start of the square-wave pulse VFBACK, if the signal VFBACK not be centered on the signal VSYNC.

The RS flip-flop circuit 40 thus enables the production of an appropriate blanking signal BLK even in certain particular cases encountered with monitors, when the signals VSYNC and VFBACK are separated for a duration d as in FIG. 3.

In particular, if the signal VFBACK disappears because the vertical scanning signal no longer functions (for a burned-out transistor, for example), the blanking signal BLK will remain active and the electron beam will remain blanked.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. A circuit to control a cathode-ray tube screen to display images, the circuit controlling scanning of an electron display beam to blank the electron display beam at least during a line flyback operation and a frame flyback operation, the circuit comprising:

a first input terminal receiving a frame synchronization signal extracted from the image signal;

a second input terminal receiving a frame flyback signal generated when a vertical deflection current of the cathode-ray tube screen is cut off;

a logic gate having a first input coupled to the first input terminal, a second input coupled to the second input terminal, a third input, and an output that provides a blanking command signal that blanks the electron display beam; and a flip-flop circuit activated by a start of the frame synchronization signal and reset by an end of the frame flyback signal, the flip-flop having an output coupled to the third input of the logic gate so that the blanking signal is active not only during the frame synchronization signal and during the frame flyback signal but also between these two signals when they are separated, wherein a start of the frame flyback signal occurs after an end of the frame synchronization signal.

2. The circuit of claim 1, further comprising a threshold comparator having an input, coupled to the second input terminal to receive the frame flyback signal and an output that provides a logic-shaped frame flyback pulse to the second input of the logic gate.

3. The circuit of claim 2, wherein the logic gate includes a NOR logic gate.

4. The circuit of claim 1, wherein the logic gate includes a NOR logic gate, the NOR logic gate having a fourth input that receives a line flyback signal generated when a horizontal deflection current of the cathode-ray tube screen is cut off.

5. A circuit for generating a blanking signal for blanking an electron beam of a display monitor, comprising:

a first logic circuit having a first input responsive to a frame synchronization signal, a second input responsive to a vertical flyback signal, and an output that provides an intermediate signal that is activated in response to a leading edge of the frame synchronization signal and is deactivated only in response to a trailing edge of the vertical flyback signal wherein a leading edge of the vertical flyback signal follows a trailing edge of the frame synchronization signal; and a second logic circuit having a first input responsive to the vertical flyback signal, a second input responsive to the frame synchronization signal, a third input responsive to the intermediate signal, a fourth input; and an output that provides a logical combination of signals present at the first, second, third, and fourth inputs.

6. The circuit of claim 5, further comprising:

a threshold comparator having an input that receives the vertical flyback signal and an output that provides a logic-shaped vertical flyback pulse to the first input of the second logic circuit.

7. The circuit of claim 5, wherein the second logic circuit further includes a fourth input responsive to a horizontal flyback signal.

8. The circuit of claim 7, further comprising a comparator having an input that receives the horizontal flyback signal and an output that provides a logic-shaped horizontal flyback pulse to the fourth input of the second logic circuit.

9. The circuit of claim 5, wherein the second logic circuit includes a NOR logic gate.

10. A method for blanking an electron beam based upon an image signal sequence, the method comprising the steps of:

(a) blanking the electron beam during a vertical flyback of the electron beam;

(b) blanking the electron beam during a frame synchronization of the electron beam;

(c) blanking the electron beam during a time interval between the vertical flyback and the frame synchronization; and wherein step (c) includes blanking the electron beam during a time beginning at a leading edge of a frame synchronization signal and ending at a trailing edge of the vertical flyback signal wherein a leading edge of the vertical flyback signal follows a trailing edge of the frame synchronization signal.

11. The method of claim 10, wherein:

step (a) includes eliminating noise in a vertical flyback signal by comparing the vertical flyback signal to a threshold.

12. The method of claim 10, further comprising the step of blanking the electron beam during a horizontal flyback of the electron beam.

13. The method of claim 12, wherein the step of blanking the electron beam during a horizontal flyback includes eliminating noise in a horizontal flyback signal by comparing the horizontal flyback signal to a threshold.

14. An apparatus for blanking an electron beam based upon an image signal sequence, the apparatus comprising:

first means for blanking the electron beam during a vertical flyback of the electron beam;

second means for blanking the electron beam during a frame synchronization of the electron beam;

third means for blanking the electron beam during a time interval between the vertical flyback and the frame synchronization; and wherein the third means includes means for blanking the electron beam during a time beginning at a leading edge of a frame synchronization signal and ending at a trailing edge of a vertical flyback signal, wherein a leading edge of the vertical flyback signal follows a trailing edge of the frame synchronization signal.

15. The apparatus of claim 14, wherein:

the first means includes means for eliminating noise in a vertical flyback signal by comparing the vertical flyback signal to a threshold.

16. The apparatus of claim 14, further comprising fourth means for blanking the electron beam during a horizontal flyback of the electron beam.

17. The apparatus of claim 16, wherein the fourth means includes means for eliminating noise in a horizontal flyback signal by comparing the horizontal flyback signal to a threshold.

18. A method for blanking an electron beam based upon on image signal sequence, the method comprising the steps of:

determining a leading edge of a frame synchronization signal;

determining a trailing edge of a vertical flyback signal; and blanking the electron beam during a time interval between the leading edge of the frame synchronization signal and the trailing edge of the vertical flyback signal wherein a leading edge of the vertical flyback signal follows a trailing edge of the frame synchronization signal.

19. The method of claim 18, further comprising a step of blanking the electron beam during a time interval in which a horizontal flyback signal is active.

20. An apparatus for blanking an electron beam based upon an image signal sequence, the apparatus comprising:

means for determining a leading edge of a frame synchronization signals;

means for determining a trailing edge of a vertical flyback signal; and means for blanking the electron beam during a time interval between the leading edge of the frame synchronization signal and the trailing edge of the vertical flyback signal, wherein a leading edge of the vertical flyback signal follows a trailing edge of the frame synchronization signal.

21. The apparatus of claim 20, further comprising means for blanking the electron beam during a time interval in which a horizontal flyback signal is active.

22. An improved electron beam blanking circuit of the type that generates a blanking signal when a horizontal flyback signal is active, when a vertical flyback signal is active, and when a frame synchronization signal is active, wherein the improvement comprises:

means for blanking the electron beam during a time interval beginning when the frame synchronization signal is active and ending when the vertical flyback signal is active; and wherein the means for blanking includes means for blanking the electron beam during a time beginning at a leading edge of the frame synchronization signal and ending at a trailing edge of the vertical flyback signal, wherein a leading edge of the vertical flyback signal follows a trailing edge of the frame synchronization signal.

23. The improved electron beam blanking circuit of claim 22 further comprising:

means for eliminating noise in the horizontal flyback signal by comparing the horizontal flyback signal to a first threshold; and means for eliminating noise in the vertical flyback signal by comparing the vertical flyback signal to a second threshold.

24. An improved electron beam blanking circuit of the type that generates a blanking signal when a horizontal flyback signal is active, when a vertical flyback signal is active, and when a frame synchronization signal is active, wherein the improvement comprises:

a logic circuit having a first input responsive to a frame synchronization signal, a second input responsive to a vertical flyback signal, and an output that provides an intermediate signal that is activated in response to a leading edge of the frame synchronization signal, remains active even when the vertical flyback signal begins after the frame synchronization signal ends, and is deactivated only in response to a trailing edge of the vertical flyback signal, the blanking signal being generated when the intermediate signal is active.

25. The improved electron beam blanking circuit of claim 24, further comprising:

a first threshold comparator having an input that receives the horizontal flyback signal and an output that provides a logic-shaped horizontal flyback pulse, the blanking signal being generated when the logic-shaped horizontal flyback pulse is active; and a second threshold comparator having an input that receives the vertical flyback signal and an output that provides a logic-shaped vertical flyback pulse, the blanking signal being generated when the logic-shaped vertical flyback pulse is active.

26. An improved electron beam blanking circuit of the type that generates a blanking signal for a display monitor when a horizontal flyback signal is active, when a vertical flyback signal is active, and when a frame synchronization signal is active, wherein a fault condition in a display monitor control circuit causes the frame synchronization signal to be suppressed, wherein the improvement comprises:

means for blanking the electron beam beginning when the frame synchronization signal is active and for continuing blanking of the electron beam while the fault condition continues; and wherein the means for blanking includes means for blanking the electron beam during a time beginning when the frame synchronization signal becomes active, ending when the vertical flyback signal becomes inactive, and wherein the vertical flyback signal becomes active after the frame synchronization signal becomes inactive.

27. The improved electron beam blanking circuit of claim 26, further comprising:

means for eliminating noise in the horizontal flyback signal by comparing the horizontal flyback signal to a first threshold; and means for eliminating noise in the vertical flyback signal by comparing the vertical flyback signal to a second threshold.

* * * * *

UNITED STATES PATENT AND TRADEMARK OFFICE
CERTIFICATE OF CORRECTION

PATENT NO. : 5,917,292
DATED : June 29, 1999
INVENTOR(S) : Sébastien Marsanne

It is certified that error appears in the above-indentified patent and that said Letters Patent is hereby corrected as shown below:

On the title page:

Item [75] should read as follows:

[75]  Inventor: Sébastien Marsanne, Grenoble, France

Figure 3A:
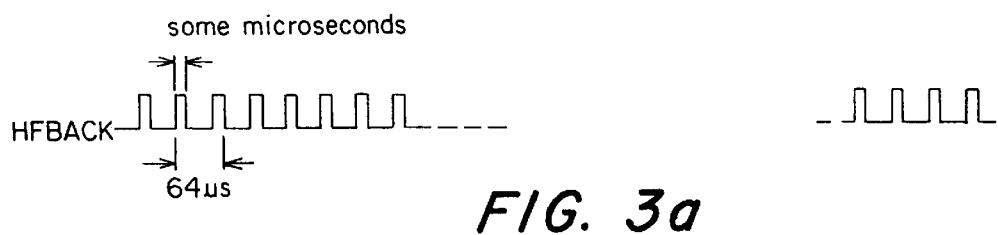
FIG. 3 shows the timing diagrams of the operation of the circuits of FIG. 2.
Figure 3B:
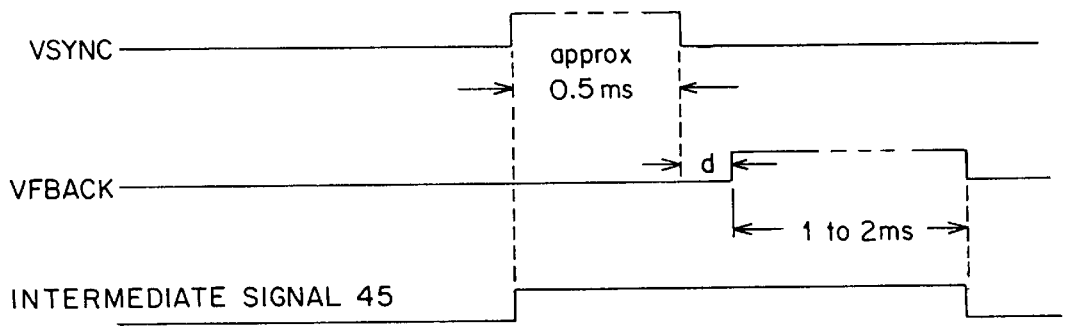
Figure 3C:

Col. 3, line 31 should read:  "FIGS. 3a-3c show the timing diagrams of the operation of the".

Col. 4, line 22 should read:  "output in accordance with the diagrams of FIGS. 3a-3c. The".

Col. 4, line 39 should read:  "FIGS. 3a-3c.".

Signed and Sealed this

Twenty-third Day of November, 1999

Attest:

Q. TODD DICKINSON

*Attesting Officer*   *Acting Commissioner of Patents and Trademarks*